US012272269B1

(12) United States Patent
Golden

(10) Patent No.: US 12,272,269 B1
(45) Date of Patent: Apr. 8, 2025

(54) PROTECTIVE DISPLAY CASE FOR COLLECTIBLE CARDS

(71) Applicant: Robert Golden, Ontario, OR (US)

(72) Inventor: Robert Golden, Ontario, OR (US)

( * ) Notice: Subject to any disclaimer, the term of this patent is extended or adjusted under 35 U.S.C. 154(b) by 0 days.

(21) Appl. No.: 18/942,683

(22) Filed: Nov. 9, 2024

(51) Int. Cl.
*G09F 1/12* (2006.01)
*G06K 7/14* (2006.01)

(52) U.S. Cl.
CPC ............ *G09F 1/12* (2013.01); *G06K 7/1417* (2013.01)

(58) Field of Classification Search
CPC ................................ G06F 1/12; G06K 7/1417
See application file for complete search history.

(56) References Cited

U.S. PATENT DOCUMENTS

| | | | | |
|---|---|---|---|---|
| 8,155,717 | B1* | 4/2012 | Watson ................... | H04M 1/18 455/90.3 |
| 9,631,969 | B1* | 4/2017 | Whalen ................. | G01G 19/02 |
| 2010/0025286 | A1* | 2/2010 | Mangaroo ............. | G06F 1/1684 206/701 |
| 2012/0262855 | A1* | 10/2012 | Park .................. | G02F 1/133308 361/679.01 |
| 2013/0292288 | A1* | 11/2013 | Willes ................... | H04M 1/185 206/521 |
| 2020/0076934 | A1* | 3/2020 | Boatner ............... | H04B 1/3833 |
| 2020/0187681 | A1* | 6/2020 | Krake ...................... | A47G 1/16 |
| 2020/0225295 | A1* | 7/2020 | Hyun ..................... | H01R 12/73 |
| 2020/0229617 | A1* | 7/2020 | Feig ......................... | A47F 3/12 |
| 2023/0350260 | A1* | 11/2023 | Martinson ......... | B32B 17/10504 |

* cited by examiner

Primary Examiner — Thien M Le

(57) ABSTRACT

The present invention relates to a protective display case for sports cards, designed to safeguard the card from physical damage while incorporating a tamper-evident mechanism and authentication features. The case consists of a transparent top cover and a base cover, both made from medical-grade polypropylene resin, which snap together to create a sealed environment protecting the card from dust, moisture, and contaminants. The top and base covers feature innovative snap mechanisms and are equipped with tamper-proof security labels, enabling immediate authentication without removing the card from the case. Additionally, the display case includes a customizable gasket that enhances protection and aesthetic appeal. This invention provides a secure and efficient method for grading and authenticating sports cards, ensuring both protection and ease of identification.

14 Claims, 8 Drawing Sheets

PROTECTIVE DISPLAY CASE FOR COLLECTIBLE CARDS

FIELD OF INVENTION

Embodiments described herein generally relate to a protective display case that may be used to protect one or more trading cards, game cards, sports cards, collectible cards, autographs, letters, coins, stamps, and the like, and more particularly, to a protective display case with tamper-proof authentication labels over snap pins.

BACKGROUND OF THE INVENTION

This invention relates to a protective display case for flat collectible cards, and more specifically to a tamper proof protective display case with Holographic Serially numbered tamper proof design as a method for authenticating and identifying the enclosed sports cards. Sports cards attract significant attention, whether pursued as a hobby or for investment. Typically, elongated and rectangular, these cards feature images of professional players from various sports like baseball, football, basketball, hockey, soccer, wrestling, tennis, and more. The images are usually in photographic form, displayed on both sides of the card. Additionally, performance stats, team associations, notable achievements, and other pertinent details related to the player or sport may be included on one or both sides of the card.

The economic worth of a sports card hinges mainly on its age, condition, and rarity. Various service providers offer reliable appraisal and authentication services for sports cards. One notable company in this field is Acu-Card, Inc. based in Stamford, Connecticut, Beckett Grading Services (BGS) (BVG), Professional Sports Authenticator (PSA), Sports card Guaranty (SGC), Certified Guaranty Company (CGC), Certified Sports Guaranty (CSG). Following a thorough assessment, these service providers encapsulate the card to safeguard its verified authenticity and shield it from physical harm. The cases utilized for such purpose are fabricated of transparent flat plastic panels and further provide for incorporation within the case of documentary indicia supplied by the service company. Such documentary indicia, generally printed on card stock, may include a catalog number, date of issue, and name of the service company.

Previous protective display patented cases that snap together, had a significant vulnerability in that it can be easily reopened. This can be done by simply inserting a blade or other thin, rigid tool into the seam or gap where the two parts of the case join. Once the blade is inserted, applying outward pressure pries the case apart, allowing unauthorized access to the card inside. This flaw undermines the security and integrity of the case, making it susceptible to tampering and unauthorized opening, which could potentially lead to damage, theft, or counterfeiting of the item it is meant to protect.

Another critical flaw in previous protective display case designs lies in their inability to fully safeguard the integrity of the items they are meant to protect. One of the most notable issues is the fading and deterioration of colors in card pictures over time. This problem arises due to a design vulnerability that allows the case to be continuously reopened, either intentionally or unintentionally. Each time the case is opened, dust, contaminants, and other environmental elements can enter the case. These foreign particles accumulate inside, gradually affecting the quality and appearance of the card, leading to fading colors and overall deterioration. This not only diminishes the visual appeal and value of the collectible but also undermines the primary purpose of the protective display case, which is preserving the item in its original condition.

In prior designs of protective display cases, another significant limitation was the inability to immediately identify and authenticate a sports card without first removing it from its casing. This required collectors to extract each card from its protective case or box to identify or verify its authenticity. This issue becomes particularly problematic when sending a sports card to an authentication company, as the card is exposed to potential damage, loss, or theft during transit.

Furthermore, it has been discovered that the solvents from adhesive glues used to seal these cases can harm the card's images over long-term storage. In addition to this, older cases and their application methods have been known to cause damage to the card corners during the encasement process. Another observed issue occurs in storage situations where two flat plastic cases press tightly against a sports card placed between them. Over time, the card surfaces may adhere to the plastic, leading to further damage after several years of storage.

At least one specification heading is required. Please delete this heading section if it is not applicable to your application. For more information regarding the headings of the specification, please see MPEP 608.01 (a).

SUMMARY OF THE INVENTION

An exemplary protective display case includes a top cover, a base cover, snap pins, and a gasket. The top cover has a front side and a back side, with at least a portion of it being transparent. The base cover is attached to the top cover and also has a front side and a back side. The front side of the base cover features at least four supporting ridges, each with a flat edge designed to accommodate a collectible card. The supporting ridges are parallel to each other. A first holding zone is formed between the edges of the four supporting ridges, capable of accommodating a collectible object.

In various embodiments, the top and base covers are made of museum grade polypropylene resin with U.V. coating and an anti-glare coating, providing protection to the display case and the collectible object inside from impacts and ultraviolet light.

In various embodiments, the protective display case includes an elevated edge along the body of the top and base cover. This elevated edge extends between the two covers and prevents debris from entering the display case. The elevated edge of the top and base cover of the case body is defined by top and bottom short edges and long side edges, the edges of the cover are further designed with multiple snap openings, specifically suited to securely receive external snap pins, these external snap pins are integral to the design, ensuring that the covers remain locked in place and permanently sealed.

The protective display case may include a gasket made of a resilient material that surrounds edges of the top and the base cover, which may be concealed in between the top and base covers making it invisible. In some embodiments, the protective display case includes at least one inserted gasket, which can be color-coded to match team colors or customized with printed graphics. The gasket acts as a barrier, effectively sealing the covers against water, dust, and other contaminants.

In various embodiments, the snap pins are further secured with a tamper-proof authentication and identification security label and a holographic tamper-proof serial number label on the short and long side edges. These identifier labels may help in recognizing the case, and/or serve as an indication of authenticity. Unlike existing card holders that lack top and bottom labeling, this unique feature enables collectors to verify the authenticity of the card and identify the card inside while stacked or in a storage case without removing it. The bottom short edge of the protective display case also has a recessed area for the hologram serial numbered tamper proof sticker.

An example method for fabricating a protective display case involves creating a top cover with a front and rear side, where the cover includes at least a transparent portion, and fabricating a base cover, which also has a front and rear side. The front side of the base cover features at least four supporting members, each with a flat edge for positioning a collectible object. The flat edges of the front two supporting members are parallel, while the flat edges of the rear two are parallel to each other and perpendicular to the front two. A cavity is formed between the flat edges of the four supporting members, capable of holding the collectible object.

The top cover and the base cover may be made of museum grade acrylic plastic resin thereby protecting the collectible object from impacts on the protective display case or ultraviolet light.

The method may further comprise coupling a gasket made of a resilient material around edges of the top cover and the base cover. In some embodiments, the method further comprises adding a security feature to the top cover and the base cover after the top cover is coupled to the base cover. The security feature may include at least 4 of the snap pins secured with a tamper-proof authentication and identification security label and a holographic tamper-proof serial number label. The security feature may be on the top and bottom edges such that the security feature is visible from the top and bottom of the casing.

The present invention stands out for its innovative lock mechanism, which incorporates multiple snap openings precisely engineered to securely accommodate external snap pins. The uniqueness of this design is further emphasized by the integration of tamper-proof authentication and identification security label sticker on the top snap pins and holographic tamper-proof serial number label sticker on the bottom snap pins. These specialized labels not only reinforce the structure's security and integrity but also offer a distinct and advanced method for the immediate identification and authentication of a sports card without requiring its removal from the casing. This feature significantly enhances security while providing a novel solution for verifying the card's authenticity, ensuring both protection and ease of identification. The design of the current invention further includes an innovative inserted gasket, which can be color-coded to match team colors or customized with printed graphics. This feature not only enhances the aesthetic appeal of the protective display case but also serves a critical functional purpose. The gasket acts as a barrier, effectively sealing the case against water, dust, and other contaminants. By preventing these elements from entering the case, the gasket ensures that the enclosed item remains in pristine condition, free from damage caused by environmental factors. This dual-purpose design element combines visual customization with enhanced protection, making it an essential component of the protective display case.

BRIEF DESCRIPTION OF DRAWINGS

To fully grasp the function, purpose and features of the invention, it's essential to refer to the detailed description presented alongside the accompanying drawing, which is an integral part of this specification. Similar reference numbers in the drawing indicate corresponding parts throughout all its figures.

DETAILED DESCRIPTION OF THE INVENTION

Figure 1:
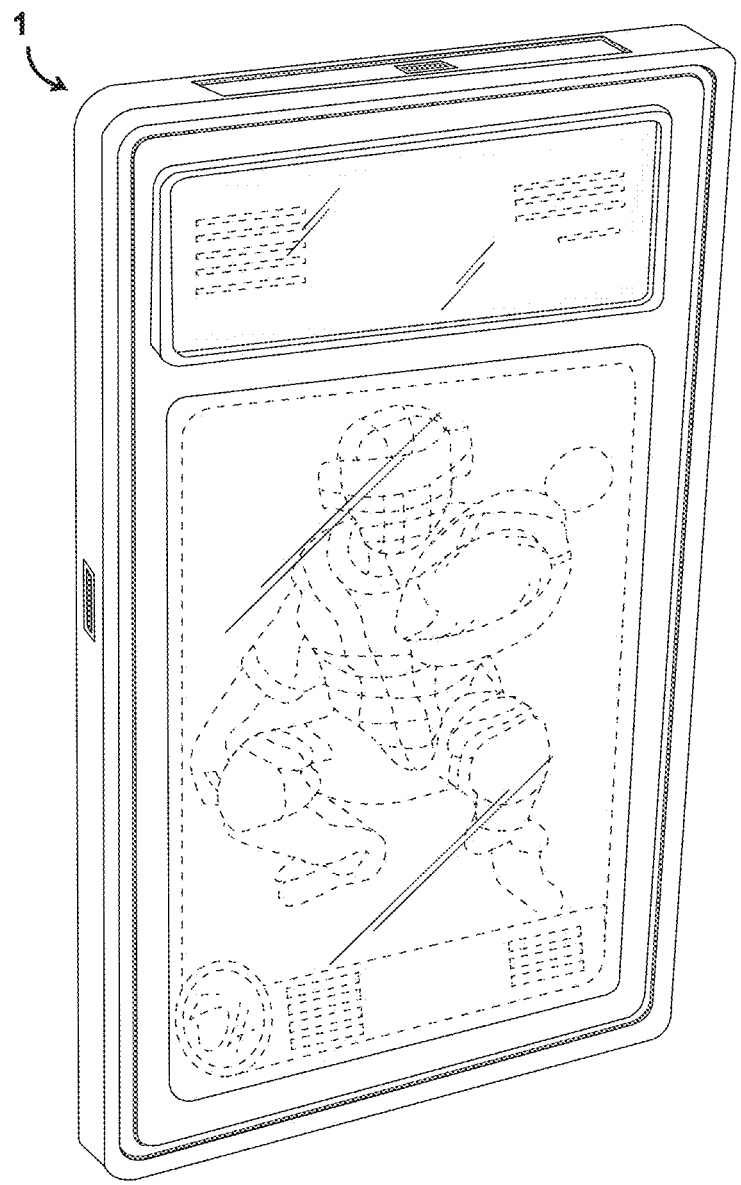
FIG. 1, is a perspective view of the protective display case of the invention shown functionally engaging a collectible card.

A protective display case may protect valuable collectible cards (e.g., trading cards, sports cards, game cards, and/or the like). The protective display case discussed herein is described as being configured to hold a sport card (e.g., the protective display case may be a card protector). However, it will be appreciated that similar protective display cases (e.g., of many different sizes) may protect other items such as stamps, autographs, paper, coins, pamphlets, and the like. It will be appreciated that any valuable item (or two or more valuable items) may be stored within the protective display case described herein. Some embodiments allow for a UV-resistant, tamper-resistant case to protect the enclosed item from damage that may affect the value of the enclosed item.

In some embodiments, the protective display case (e.g., sport card case) also includes a perimeter gasket sandwiched between the top case cover and rear case cover of the protective display case. The gasket may protect the card encased within the protective display case.

While a frosted clear gasket is shown enclosed, it will be appreciated that the gasket may be available in different colors, allowing a user to customize a protective display case using different colored gaskets.

It will be appreciated that the gasket may be composed of one or more different materials. The one or more different materials may be resilient. The gasket may be composed of silicone or TPU (thermoplastic polyurethane).

The protective display case may protect a graded or valuable card and/or contain an indication of the grading system (or grade). For example, an indication on the protective display case may indicate a grading of the card and one or more overt or covert security features to validate the authenticity of the card and grade. The protective display case may protect a graded card from tampering and protect the authenticity of the graded card.

In some embodiments, the protective display case is rectangular and may have rounded or sharp corners. In various embodiments, the protective display case is rectangular with curved corners. The protective display case consists of two or more members that may be coupled to each other (e.g., via interlocking mechanism). The slabs or portions may be coupled to create a chamber or cavity that may hold or store a card or other collectible. In various embodiments, the top cover and the rear cover are adhered to one another to create a tamper-resistant seal. It will be appreciated that the protective display case may include any number of parts that are coupled together.

The protective display case may include one or more grading system which allow the card and protective display case to be graded with an organization IGC. (Investors Grading Club) and/or grading system. An owner of a collectible card may send a request to a grading Organization i.e. IGC (Investors Grading Club) to grade their collectible card based on their physical condition. A higher grade typically correlates with the card being more desirable and valuable. The grading system and community may grade collectible cards using community grading network, and Artificial intelligence thereby reducing the occurrence of inconsistent grading, which occurs when collectible cards are graded only by humans.

In an embodiment, a user purchases a blank protective case and encapsulates the card themselves. They generate a set of three generic labels provided by Investors Grading Club (IGC), print the card information on them, and place the main label into the card holder's label area or second rectangular holding zone, while attaching the top and bottom labels to the sealed card casing. The customer then visits our website to register the card, providing pictures and the assigned serial number.

In another embodiment, a user takes front and back scans, along with a series of photos and a video of the original sports card, they are then further uploaded to the website for AI (Artificial intelligence) and Club member grading. A grade result is returned to the customer. For a fee, the customer receives a protective display case with three pre-printed hologram labels displaying the serial number, player's name, and grade. The customer further assembles the protective display cases and labels, re-scans the protective display case front and back, and uploads the scans to the Club database to finalize the registration. Thus, a card can be graded, labeled, encapsulated, and registered without it ever leaving the owner's possession.

FIG. 1a, depicts a perspective view of a protective display case 1 with a gasket (not visible). In this example, the protective display case includes a top cover casing, and a rear cover casing. In the example of FIG. 1, the protective display case 1 is rectangular and has rounded corners. The protective display case 1 may include a top cover coupled to a rear cover. The top and/or the rear panel may contain supporting ridges and protective members (e.g., formed from plastic or any material) configured to keep the top cover and the rear cover coupled and to position the collectible object. The top cover and the rear cover are further discussed herein.

In various embodiments, the top cover and/or the rear cover may be transparent thereby allowing the collectible card to be viewed through the protective display case.

Figure 2:
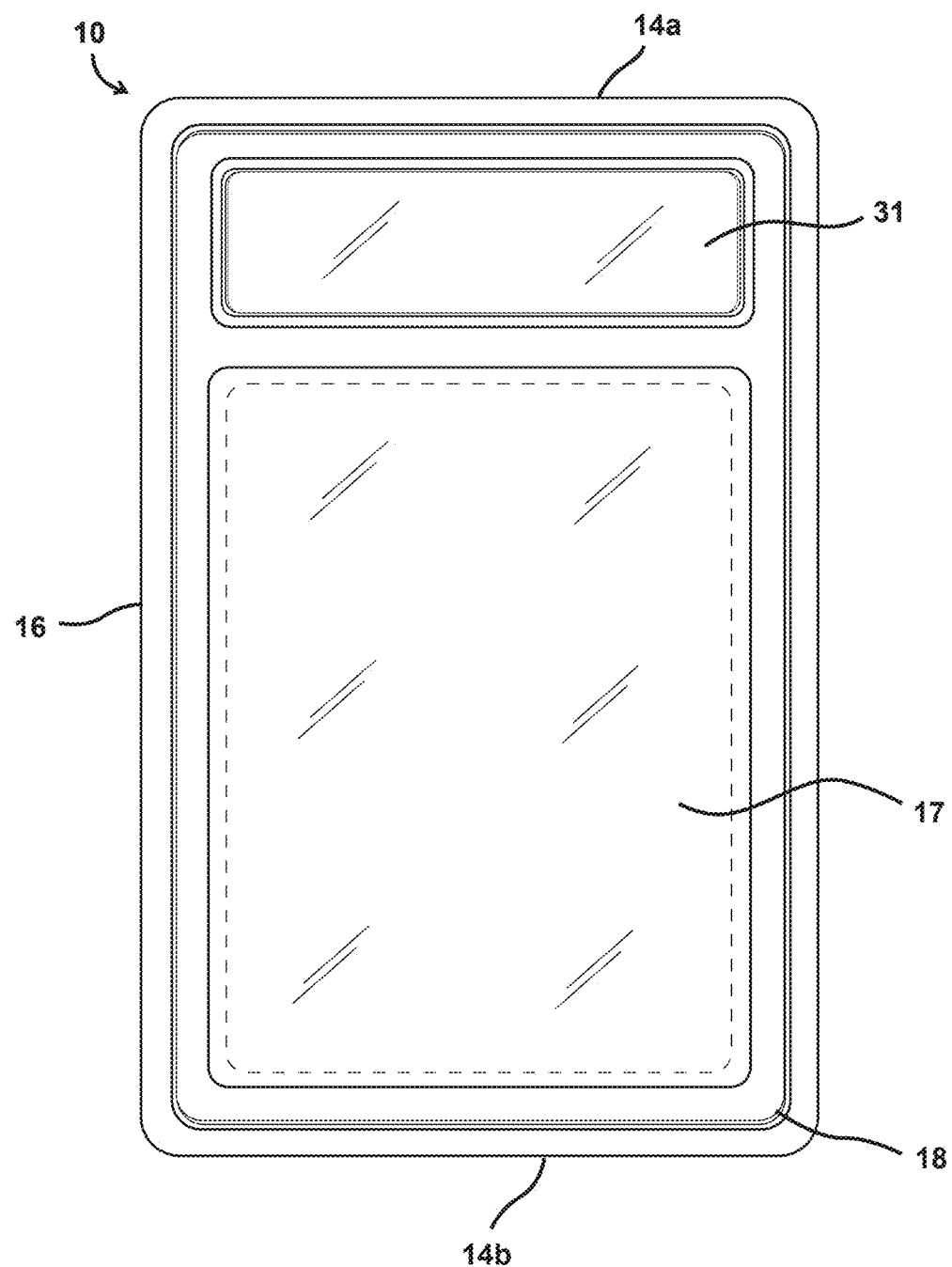
FIG. 2, is a front view of the top cover case of FIG. 1.

FIG. 2 depicts a top cover 10 with top and bottom short side edges 14a and 14b respectively and long side edges 16. The front cover 10 is typically outwards and in front of the protective display case 1, when the rear cover is joined to the front cover 10. The upper part of the case may be or include a second holding zone, window, holder, cavity, 31 or the like configured to display information and the like for positioning and holding the media (e.g., Player name, gradings, or the like) for display through the upper portion. There may be a first holding zone, cavity configured to hold, position, and protect the collectible object behind the transparent window 17 of the lower portion. The lower portion may be transparent or include a transparent material.

The protective display case 1 may include any number of rectangular supportive members to position and reduce movement of the collectible object 13 for consistent display through the lower portion transparent window 17. The top cover 10 features a groove, indentation, or recessed track 18 encircling its perimeter, facilitating the stacking of similar protective display cases for efficient storage.

In various embodiments, the short and long side edges of the top cover may be equipped with snap slots (not visible) that receive snap pins and act as extra sealing or locking mechanism for the protective display case 1, when the top and rear covers are merged together. The Snap pins (not visible) are further secured with a tamper-proof authentication and identification security label and a holographic tamper-proof serial number label on the short and long side edges. In one example, the snap slots may be positioned on one or more positions on the edges of the protective display case 1 around the upper long side edges 16 and the short side edges 14a & 14b.

Figure 3:
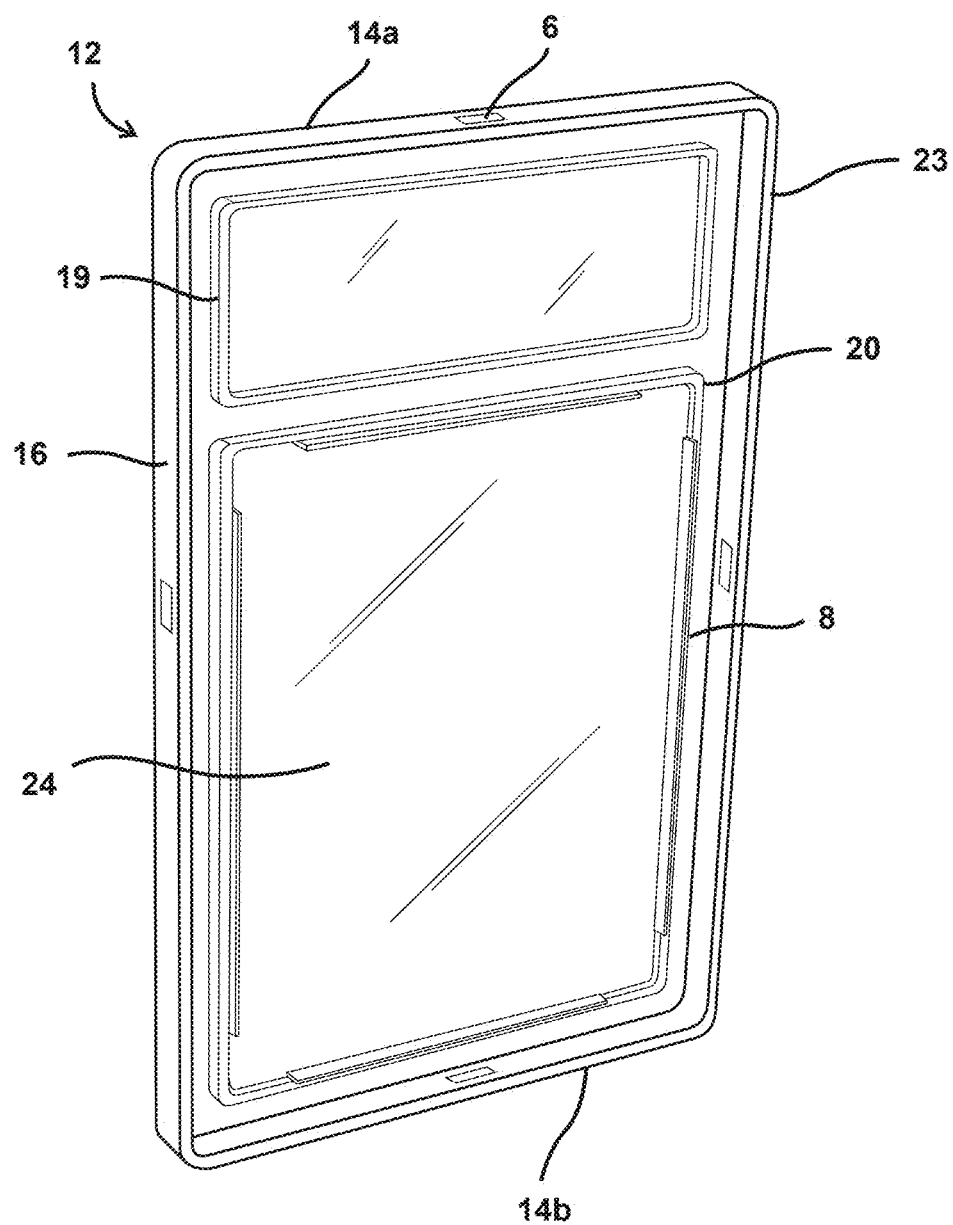
FIG. 3, is a front view of the rear cover case of FIG. 1.

FIG. 3 depicts the front side of a rear cover 12. The front side of the rear cover 12 is typically on the inside of the protective display case 1 when the rear panel 12 is joined to the top cover 10. The rear cover 12 includes a body 23 with a perimeter member 20 disposed along the perimeter of one side of the body 20. The perimeter member 20 may allow the top panel 10 and the rear panel 12 to be held together and/or may be used to hold the two halves together (e.g., without sonic or laser welding). In various embodiments, the perimeter member 20 may prevent debris from entering into the protective display case 1. Further, the perimeter member 20 may assist in reducing opportunities to tamper with the protective display case 1, reducing opportunities to tamper with a security feature of the protective apparatus 1 (e.g., hologram sticker, or the like), or reducing opportunities to tamper with the collectible object. Supporting members 8 & 19 are rectangular protrusions that may assist in holding or positioning the collectible object. There may be any number of supporting members. In various embodiments, there is another supporting member that holds or positions one of the sides of the collectible object. The supporting members 8 may be any shape such as rectangular, circular (e.g., posts), polygonal, and/or the like. There may be any number of supporting members 8.

The supporting members 8 & 19 (and any other supporting member) may extend the depth of the cavity defined by the rear cover 12 and the top cover 10 when joined together. The supporting members 8 & 19 may assist in holding the collectible object and/or providing strength and rigidity to the protective display case 1.

While FIG. 2 depicts four supporting members 8, that are positioned to hold sides of the collectible object, it will be appreciated that there may be any number of supporting members. For example, in some embodiments, there may be only one supporting member that forms a perimeter about a cavity configured to hold the collectible object. In another example, rear cover 12 may include supporting members configured to hold corners of the collectible object and/or sides of the collectible object.

The rear cover 12 may be formed by injection molding along with the supporting members 8.

The supporting member 8 may be any shape. As depicted in FIG. 2, the supporting member 19 forms a perimeter about the upper portion of the rear cover. The supporting member 19 surrounding the upper portion may be configured to retain, protect, or hold paper, media, or the like containing information such as information regarding the collectible object, a grade, a grading system, a security measure (e.g., hologram), and/or the like.

In various embodiments, the supporting member 19 may only surround the upper portion.

The rear cover 12 may include any number of supporting members and the supporting members may be of any shape. For example, the protective display case 1 may include a supporting member that surrounds the lower portion (e.g., the supporting member may be a rectangle that surrounds the lower portion much like the supporting member surrounds the upper portion.

Figure 4:
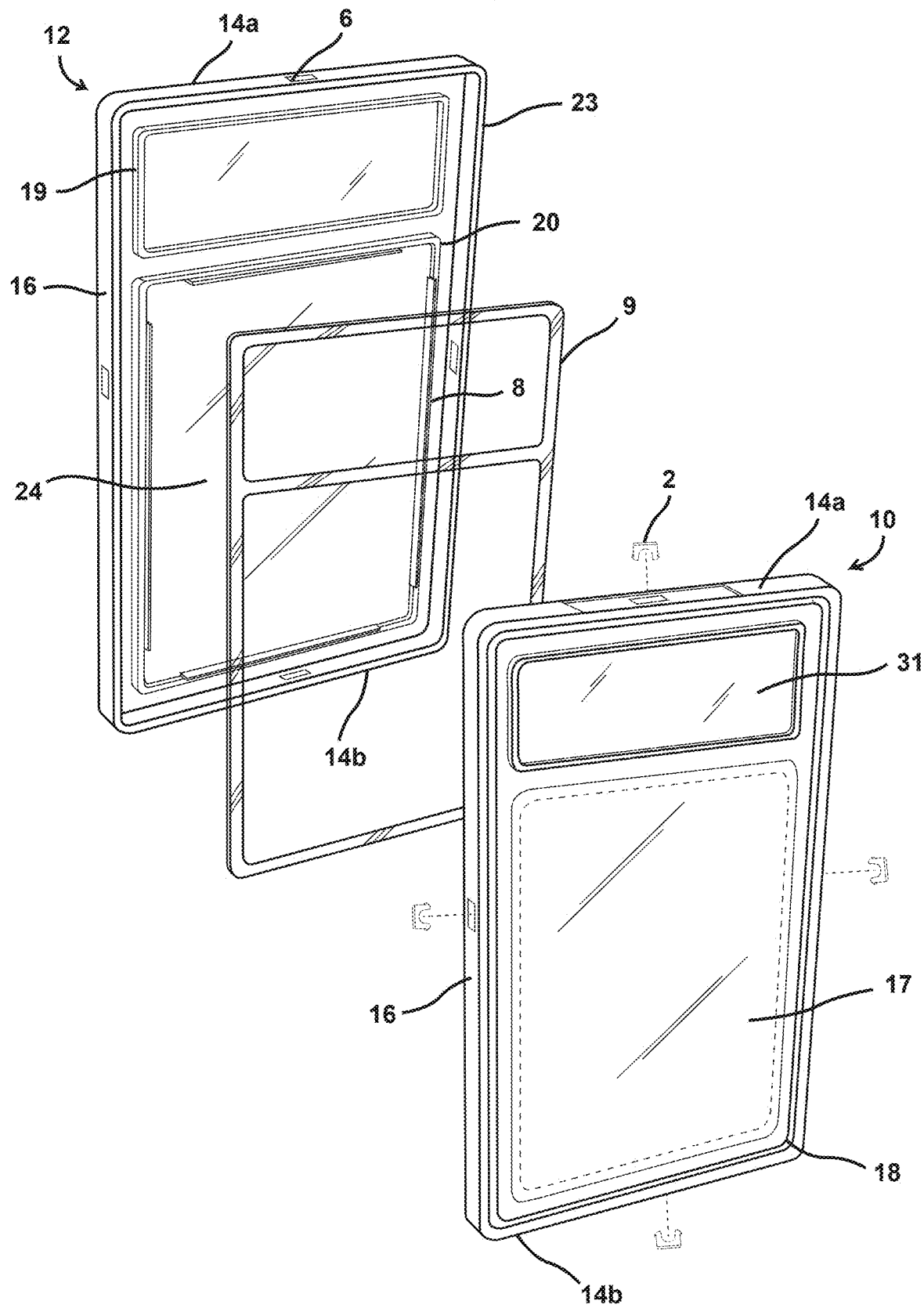
FIG. 4, is an explosive view of the protective display case of FIG. 1.

FIG. 4 depicts an explosive view of the protective display case of 1, featuring a gasket 9 according to some embodiments. The gasket 9 may be composed of any resilient material such as silicone, thermoplastic elastomers (TPEs), latex, or rubber.

In some embodiments, the gasket 9 consists of a single piece of silicon fabricated into a shape that allows the gasket 1 to seal the protective display case and prevent moisture from sipping in. In one example, the gasket 9 may be placed around the inner perimeter of the protective display case 1 of FIG. 1. In various embodiments, the gasket 9 is removable and provides further protection to the card protector by preventing moisture and dust from contaminating the card and a tamper-proof authentication method, providing an extra layer of security and integrity to the overall structure without the need for sonic welding, gluing or other invasive methods. The gasket 9 may be removable. Snap slots 6 that receive snap pins 2 and act as extra sealing or locking mechanism for the protective display case 1, when the top and rear covers are merged together. The Snap pins are further secured with a tamper-proof authentication and identification security label and a holographic tamper-proof serial number label on the short and long side edges.

FIG. 4, depicts the external locking snap pins 2. These snap pins are used to permanently secure the case cover together through the snap slots located on the edges of the protective display case, ensuring a secure and permanent lock, as illustrated in FIG. 1.

Figure 5:
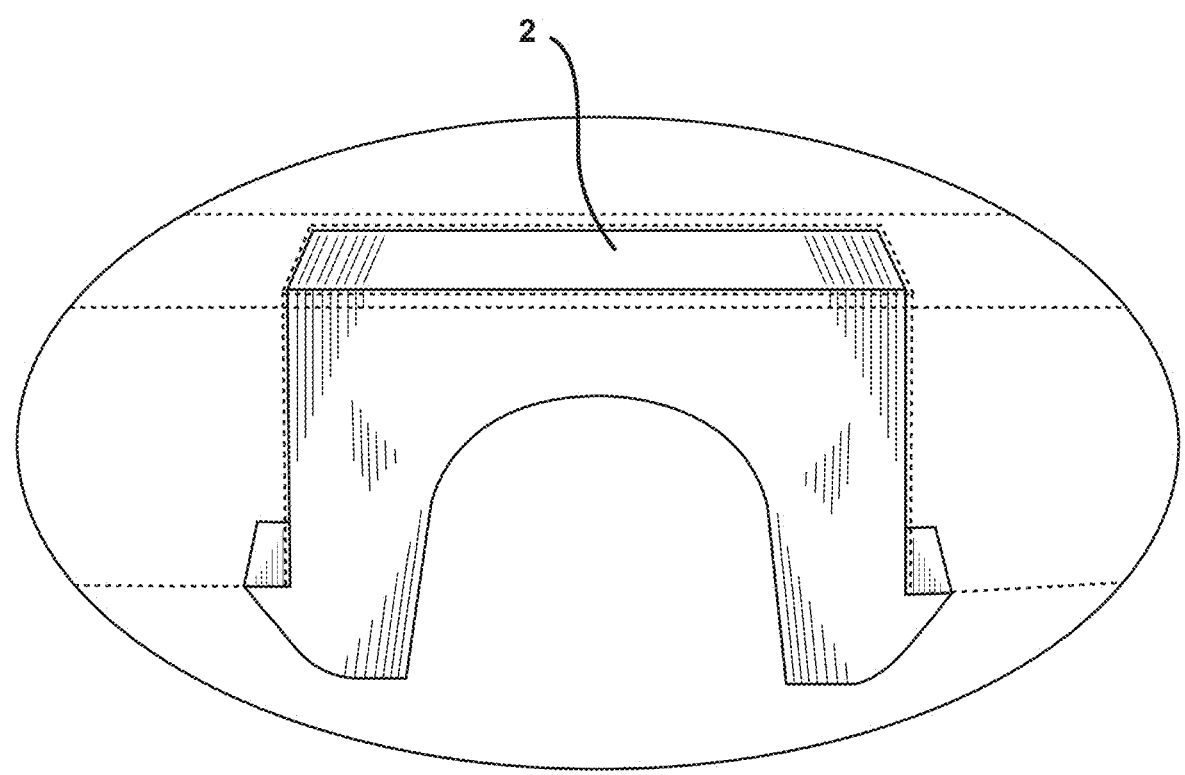
FIG. 5, is a plan view of the snap pin lock components of the protective display case of FIG. 1.

FIG. 5, depicts the top side view of the protective display case 1 of the present invention highlighting the recessed area designed for the player I.D. security sticker 40, located on the short side edge 14a which covers the snap pins.

Figure 6:
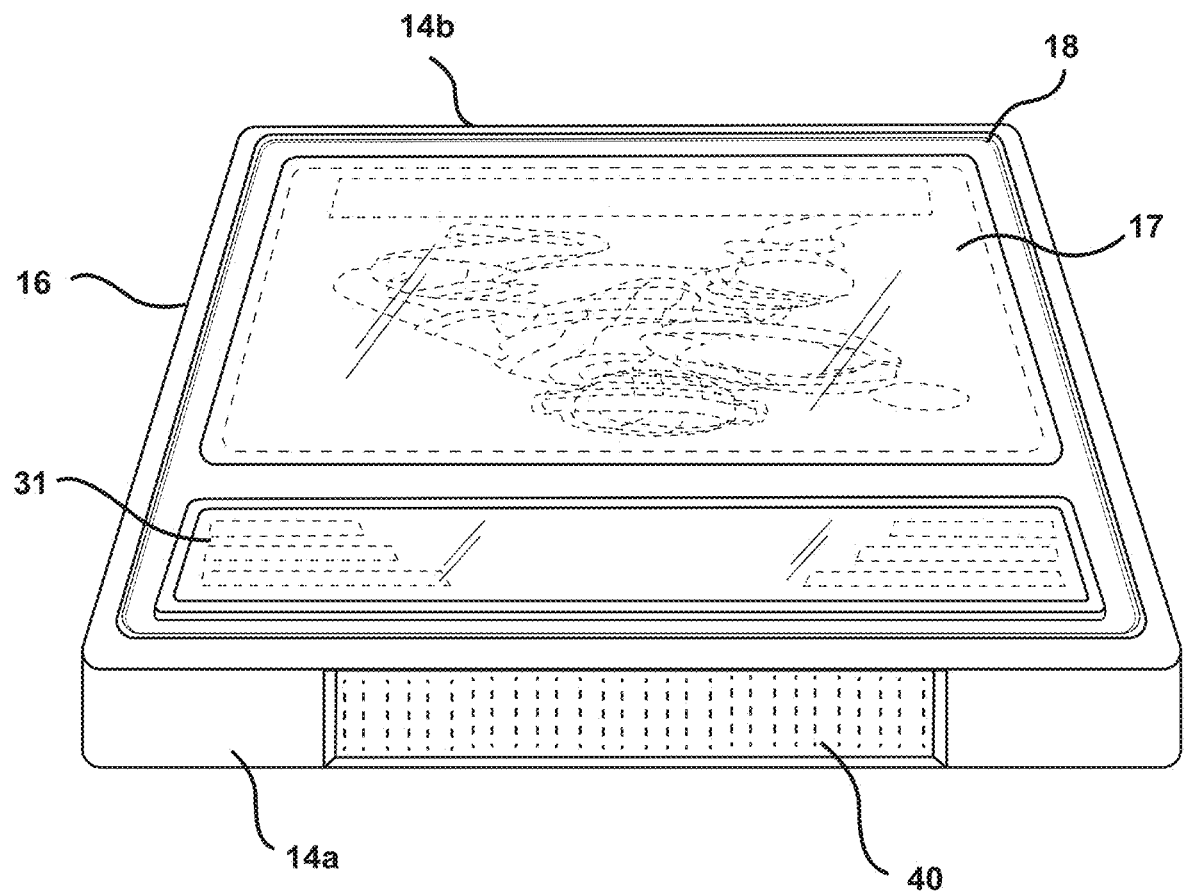
FIG. 6, is a top side view of the protective display case of FIG. 1.

FIG. 6, depicts a top side view of the protective display case 1 shown demonstrated in a stackable configuration. The player I.D. authentication security sticker 40 is visible, enabling identification of the card even when multiple cases of the present invention are stacked together.

Figure 7:
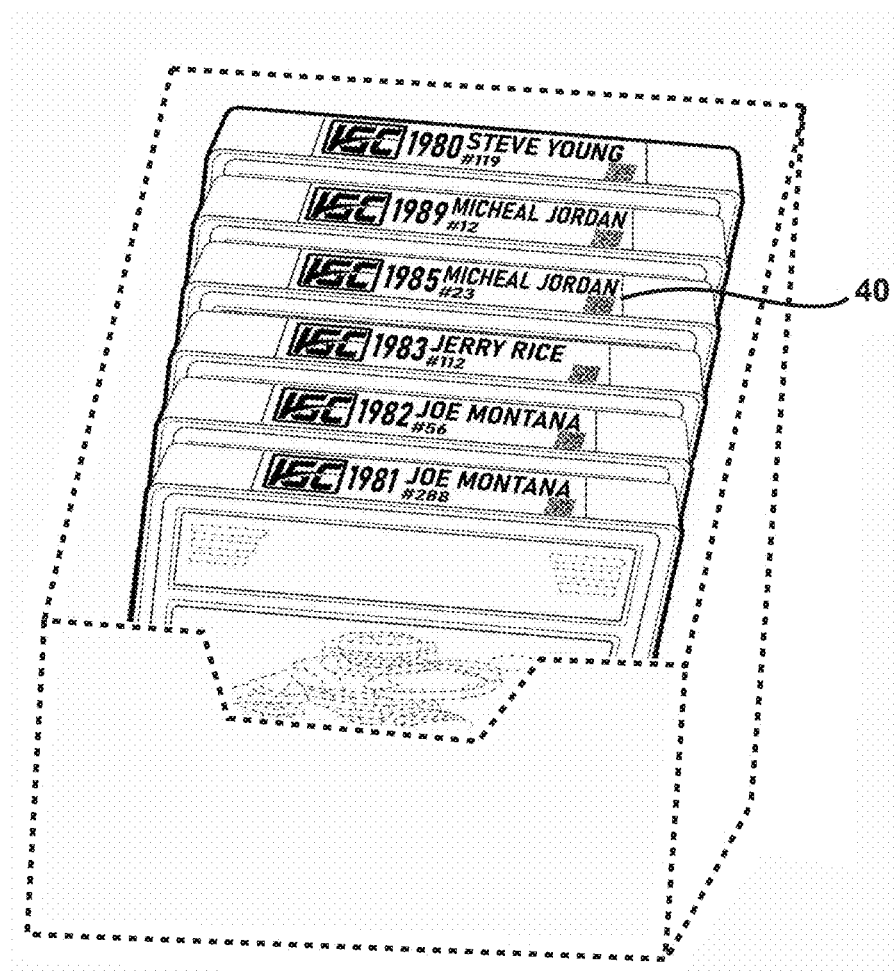
FIG. 7, is a plan view of the card's player I.D. security sticker of the protective display case.
Figure 8:
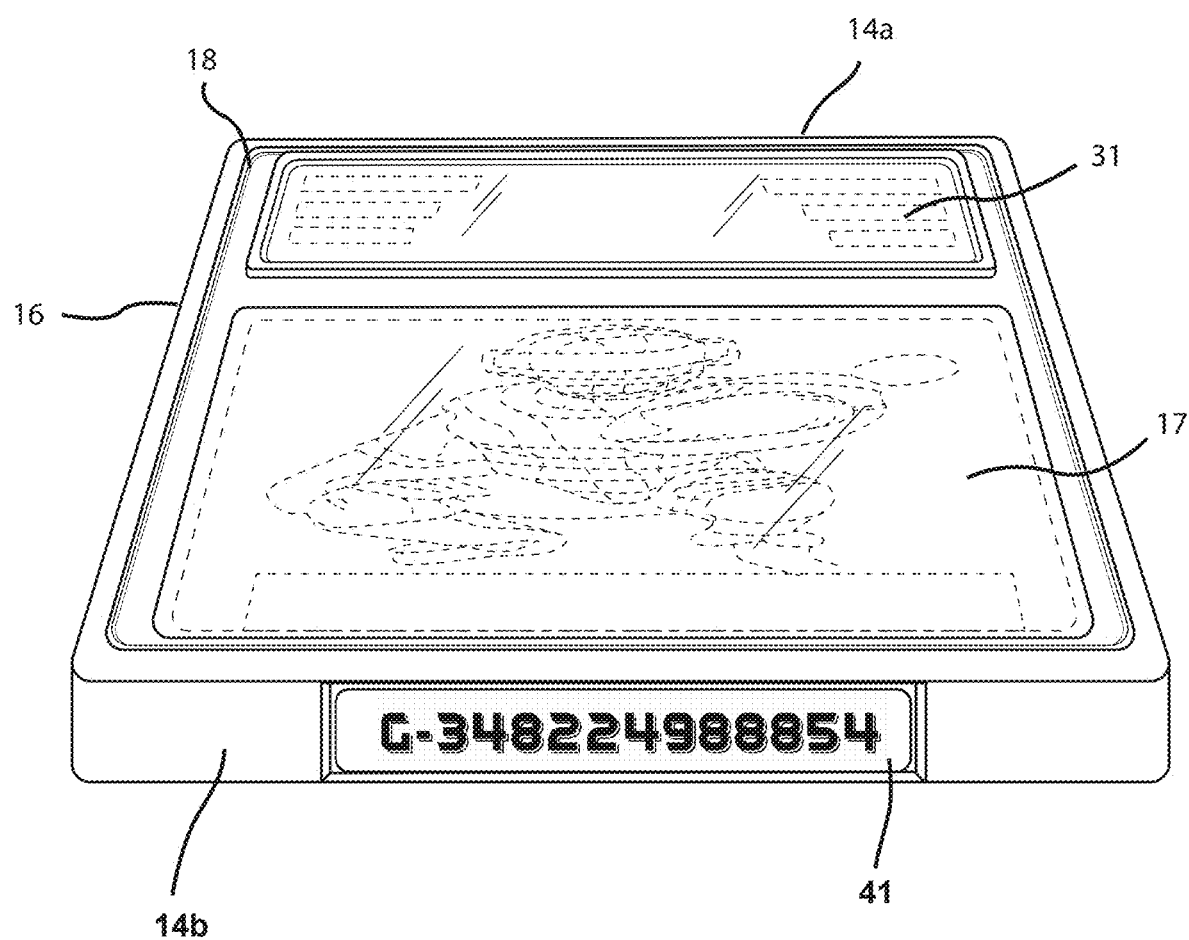
FIG. 8, is a plan view of the hologram serial numbered tamper proof sticker of the protective display case of FIG. 1.

FIG. 7, depicts a bottom side view of the protective display 1. The bottom of the case reveals a hologram serial-numbered tamper-proof sticker 41, designed to cover the snap pin. This sticker serves as an added security measure, preventing any tampering or unauthorized reopening of the case, whether intentional or accidental.

PRIOR ART

US2010313037A1 reveals a collectible case authentication system, device and method there is a collectible case authentication device and method configured to facilitate authentication of a collectible. The collectible case authentication device includes a secured housing and a data interface module. The collectible case authentication device also includes a data storage device including an authentication module. The authentication module includes an encryption module including a public key associated with a private key.

US2023073559A1 reveals a protective Card Case and Grading System for protecting collectibles may be provided with integral stands. These and/or other cases may accept one of a plurality of inserts with card trays when receiving collectible cards to address the different thicknesses of collectible cards in the marketplace.

U.S. Pat. No. 5,040,671A discloses a transparent plastic case is provided for the protective long-term storage of flat collectible items. The case consists of first and second panels of matching elongated rectangular perimeter adapted to be cohesively sealed to enclose a collectible item disposed in a transparent retainer, and a documentation card. The dimensions of the case relative to the retainer are such that the collectible item within a sealed case is not tightly pressed against the retainer. The panels are further configured to facilitate stacking of a number of the cases.

U.S. Pat. No. 11,403,970B2 discloses a protective display case for collectibles, such as trading cards, rare coins and comic books. The protective display case includes a first compartment sized and shaped to receive and at least partially enclose the collectible and a first portion of the sleeve holding the collectible without obscuring visibility of the collectible, a second compartment adjoining the first compartment and sized and shaped to receive and at least partially enclose the label and a second portion of the sleeve holding the label without obscuring visibility of the label, a first end proximate the first compartment; and a second end proximate the second compartment, opposite the first end.

U.S. Pat. No. 11,605,312B2 discloses a protective case for a collectible includes a cover and a base. The cover includes a transparent panel having a top surface and a bottom surface, and a flange extending from a periphery of the bottom surface to define a recess. The flange has an inward facing surface facing the recess, and a slot extending inwardly from the inward facing surface. The base includes a transparent plate that is nested in the recess. The plate has a top edge, a bottom edge, and a sidewall extending between the top edge and the bottom edge. The sidewall includes a tab that is received and locked in the slot, to oppose removal of the plate from the recess. A collectible can be positioned between the plate and the panel and received in a seat of the plate and/or the panel.

U.S. Pat. No. 6,851,556B1 The invention discloses a display holder for securely holding and displaying a valuable collectible card comprising two panels connected along with a common hinge line or coupled together. The panel has a recessed portion having a suitable card-matchable dimension and a depth for receiving the card to be held, whereas a latch able extending member mounted on the panel is securely matched with a latching mechanism mounted within the cap recess of a holding cap to securely hold the card within the panels.

US2006248769A1 disclosed a display device provided for the displaying of collectible cards on two sides. The device includes a generally planar card support mat, a mat having a pair of opposed planar surfaces with apertures extending there through. The apertures are sized to support a collectible card therein. A pair of transparent plates overlie each of the planar surfaces of the mat allowing viewing of each side of the two-sided card. A frame binds and supports the mat and encloses the cards in a tamper evident protective manner.

US2023000227A1 disclosed a protective case for collectible cards and other items, which provides a solution to the problem of protecting collectible items while shipping and displaying. The core components of the invention are a case with an indent configured to secure a collectible card or other item and a flat base configured to act as a base so the protective case is able to stand on end and display the collectible card or other item, and connective hinges configured to secure the connective hinges to other protective cases or other protective devices. In light of the prior art design, the present invention seeks to provide a permanently locked protective display case with snap pins, a perimeter gasket preventing moisture and dust from contaminating the card and a tamper-proof authentication method, providing an extra layer of security and integrity to the overall structure without the need for sonic welding, gluing or other invasive methods. This allows the card to be sealed while remaining in the card owner's possession. At least one specification heading is required. Please delete this heading section if it is not applicable to your application. For more information regarding the headings of the specification, please see MPEP 608.01 (a).

The invention claimed is:

1. A protective display case comprising:
    a top cover, the top cover including a front side and a back side, the top cover including at least a transparent portion;
    a rear cover coupled to the top cover, the rear cover including a front side and a back side, the front side of the rear cover including at least 5 supporting members, each of the at least five supporting members including a flat edge to enable positioning of a collectible object, the flat edge of a first two of the supporting members being parallel to each other, the flat edge of a second two of the supporting members being parallel to each other and perpendicular to the first two of the supporting members, a cavity being at least between the flat edges of the four supporting members, the cavity capable of holding the collectible object;
    wherein coupling the top cover and the rear cover does not comprise ultrasonic welding, a gasket fitted on the inner side of the covers, the gasket being crystal clear and extending around a perimeter of the covers, the gasket covering is inside of the protective display case between the top cover and the rear cover, the inserted gasket is Color-coded to match team colors or customized with printed graphics and positioned between the top cover and the base cover, a plurality of multiple snap openings positioned on the edges of both the top cover and the rear cover, and configured to receive external snap pins, wherein, said external snap pins are designed to engage with the snap openings to lock the top cover to the base cover permanently, creating a sealed environment.

2. The protective display case of claim 1, comprising of multiple snap openings positioned on the edges of both the top cover and the rear cover, and configured to receive external snap pins, wherein, said external snap pins are designed to engage with the snap openings to lock the top cover to the base cover permanently, creating a sealed environment.

3. The protective display case of claim 1, further comprising a tamper-proof authentication and identification security label affixed to the top snap pins.

4. The protective display case of claim 1, further comprising a holographic tamper-proof serial number label affixed to the bottom snap pins.

5. The protective apparatus of claim 1, wherein the rear cover or the top cover includes a perimeter member at the perimeter of the rear cover or the top cover, the perimeter member configured to engage with the elevated edge to couple the top cover and the rear cover together forming a self-seal case.

6. The protective display case of claim 1, wherein the inserted gasket is Color-coded to match team colors or customized with printed graphics and positioned between the top cover and the base cover.

7. The protective display case of claim 1, wherein the top cover features a recessed area on the top short edge configured to accommodate the tamper-proof player identification and authentication security label over the snap pins.

8. The protective display case of claim 1, wherein the protective display case features a recessed area on the bottom short edge configured to accommodate the holographic tamper-proof serial number label.

9. A method for fabricating a protective display case, the method comprising:
    fabricating a top cover, the top cover including a front side and a back side, the top cover including at least a transparent portion;
    fabricating a rear cover, the rear cover including a front side and a back side, wherein coupling the top cover and the rear cover does not comprise ultrasonic welding, the front side of the rear cover including at least four supporting members, each of the at least four supporting members including a flat edge to enable positioning of a collectible object, the flat edge of a first two of the supporting members being parallel to each other, the flat edge of a second two of the supporting members being parallel to each other and 3 perpendicular to the first two of the supporting members, a cavity being at least between the flat edges of the four supporting members, the cavity capable of holding the collectible object;
    fitting a gasket to the inner edges of the covers, the gasket being rectangular and extending around a perimeter of the inner side of the top and rear cover edges and sealing the top cover and the rear cover, wherein the gasket is Color-coded to match team colors or customized with printed graphics.

10. The method of claim 9, wherein the top cover and the rear cover are made of museum grade polypropylene resin with U.V. coating and an anti-glare coating, the protective display case being thereby protected from at least some impacts and UV light.

11. The method of claim 9, further comprising fitting a gasket made of a resilient material around edges of the top cover and the rear cover.

12. The method of claim 9, further comprising adding a security feature on the top and bottom short edges of the protective display case after the snap pins are locked into the sap slots, the security feature including at least one of a hologram serial-numbered tamper-proof sticker and a player I.D. authentication security sticker on top of the snap pins such that the security feature is visible from the top and bottom of the case.

13. The method of claim 9, wherein coupling the top cover and the rear cover does not comprise ultrasonic welding.

14. A method for grading and authenticating a sports card, the method comprising:
    1. Initiating a rookie registration process, including: Providing a protective display case and a set of three labels for the sports card; Encapsulating the sports card within the protective display case; Generating and printing card-specific information on the set of three labels; Placing a first label in a label area within the protective display case; affixing a second and a third label to the exterior of the sealed protective display case; and Registering the encapsulated sports card by uploading images of the card and its assigned serial number to a designated website;

2. Conducting a graded registration process, including: Scanning the front and back of the sports card and capturing a series of photos and a video of the original sports card; Uploading the scanned images, photos, and video to a grading website; Receiving a grade result generated by an artificial intelligence system and verified by club members; Receiving a protective display case preprinted with hologram labels indicating the serial number, grade, player's name, and other grading information; assembling the protective display case and affixing the hologram labels to the encapsulated sports card; Rescanning the front and back of the encapsulated sports card within the assembled protective display case; and Uploading the rescanned images to a club database to complete the registration process; wherein the sports card is graded, labeled, encapsulated, and registered while remaining in the possession of the card owner.

\* \* \* \* \*